United States Patent [19]

Fuhrman

[11] Patent Number: 4,558,931
[45] Date of Patent: Dec. 17, 1985

[54] COLORED SOFT CONTACT LENS
[75] Inventor: Ari Fuhrman, Miami Beach, Fla.
[73] Assignee: Color Optics, Ltd. (Partnership), Scarsdale, N.Y.
[21] Appl. No.: 364,914
[22] Filed: Apr. 2, 1982
[51] Int. Cl.⁴ ............................................. G02C 7/04
[52] U.S. Cl. ................................ 351/160 H; 351/162
[58] Field of Search ................ 351/160 H, 160 R, 162
[56] References Cited

U.S. PATENT DOCUMENTS 3,454,332  7/1969  Siegel ........................... 351/160 R
3,786,812  1/1974  Naefe ............................. 351/162 X
4,121,885 10/1978  Erickson et al. ........... 351/160 H X
4,208,362  6/1980  Deichert et al. ........... 351/160 H X

FOREIGN PATENT DOCUMENTS 511827  5/1978  U.S.S.R. ............................ 351/162

Primary Examiner—John K. Corbin
Assistant Examiner—Scott J. Sugarman
Attorney, Agent, or Firm—Stiefel, Gross, Kurland & Pavane

[57] ABSTRACT

A cosmetic contact lens is lathe cut from a body of stacked discs fused together. The discs are made from hydrophilic polymer, some of which are colored (pigmented or dyed). The pupillary area is formed in a central zone of the lens from a clear layer. The secondary zone formed about the central zone is formed at least partly from one or more colored layers. The peripheral zone formed about the secondary zone is formed from a clear layer. All of the layers are disposed generally parallel to the circular edge of the lens, and the layers may be flat or they may be segments of spheres. This construction provides concentric rings of colors in blended, overlapping relationship for covering the iris and giving a cosmetic effect.

3 Claims, 9 Drawing Figures

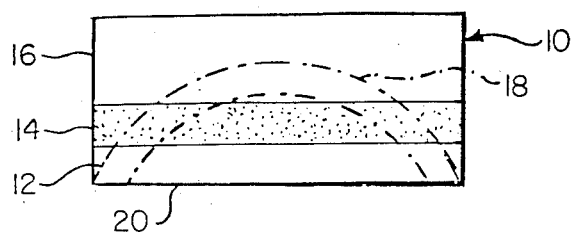
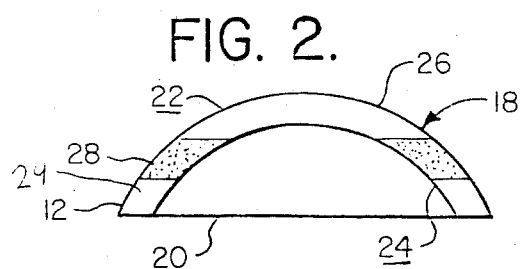
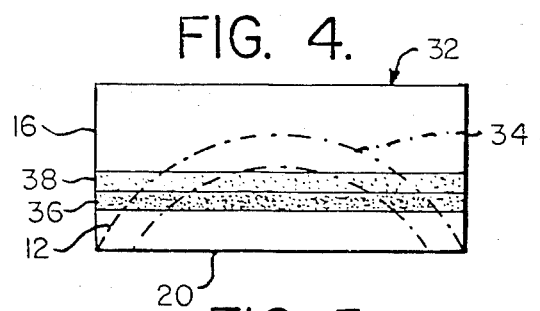
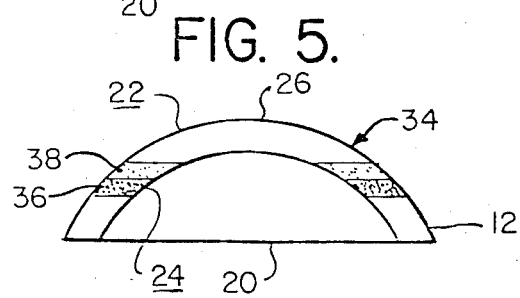
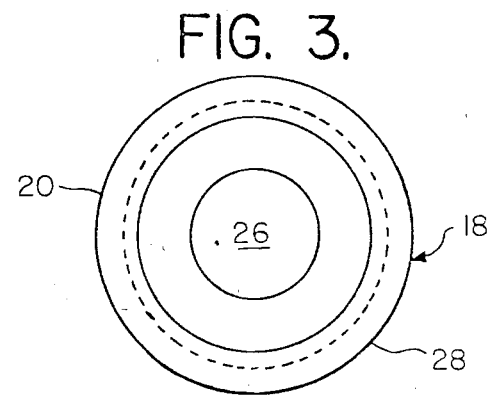
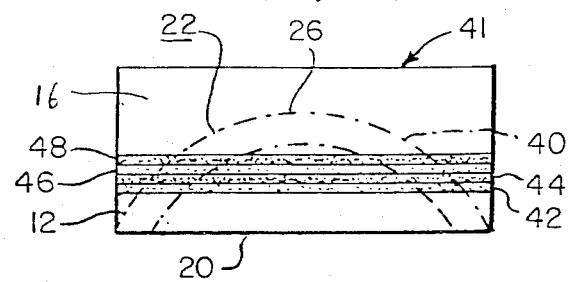
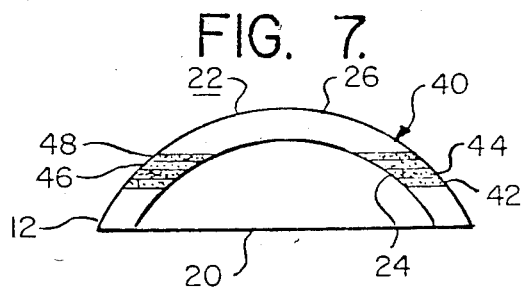
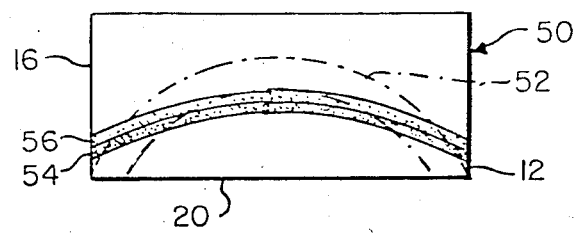
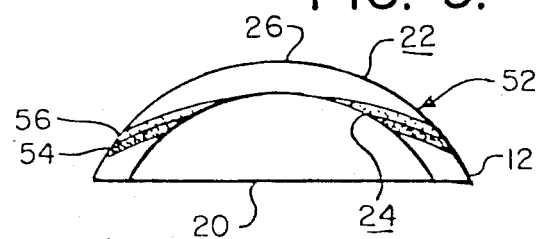

COLORED SOFT CONTACT LENS

TECHNICAL FIELD

This invention relates to corneal contact lenses made of soft plastic material and particularly to soft contact lenses manufactured by lathe cutting or machining a preformed multicolored body of plastic material in prehydrated condition.

BACKGROUND ART

Hydrophilic or soft contact lenses are mainly produced from water-absorbable plastic materials such as 2-hydroxyethylmethacrylate (HEMA) which may be crosslinked with a tetra-functional monomer such as ethylene glycol dimethacrylate as disclosed in U.S. Pat. No. 3,988,274.

Attempts have been made to color such soft contact lenses for the purpose of enhancing the aesthetic beauty of the eye of the wearer of the colored lens. One prior art technique is to paint or print a colored portion onto a soft contact lens using an implement such as a brush, as disclosed in Contact Lens Forum, Volume 3, No. 8, Aug., 1978, page 89. Another technique involves the cementing of a colored covering layer onto a clear hydrogel lens as disclosed in U.S. Pat. No. 3,679,504. According to these techniques, the entire surface of the contact lens is colored. This is a disadvantage since the coloring material separates from the lens during use and is not sufficiently gas permeable.

In order to overcome these disadvantages, a number of prior art techniques have been developed. According to these prior art techniques the colored soft contact lens is manufactured with a clear center portion so as not to obstruct the vision of the wearer. For example, U.S. Pat. No. 3,679,504 discloses a method of producing a colored soft contact lens having a clear center portion surrounded by a colored portion. According to the patent, a thin covering layer of hydrogel is first formed, whereupon coloring is applied to the covering layer. The colored covering layer is then joined by a monomer cement to the concave face of an existing soft lens. The coloring may be applied such that the central lens portion is left clear.

U.S. Pat. No. 3,962,505 also discloses a colored soft contact lens with a clear central portion. The patent discloses a method of making a contact lens having an annular colored ring concentric with a clear central portion. According to the method, a cylindrical well is cut in a plastic block, and an annular ring which may be colored, is disposed in the well. The portion of the well above the ring is subsequently sealed by cementing a plug therein. The desired lens shape is then cut from the plastic block to yield a lens having a colored annular ring.

U.S. Pat. No. 4,157,892 is also directed to a colored soft contact lens having a clear central portion.

While these prior art techniques for producing colored soft contact lenses having a clear central portion overcome the disadvantage possessed by the prior art techniques which color the entire surface of the soft contact lens, the manufacturing processes for producing these improved colored soft contact lenses are complicated and expensive.

Applicant has overcome these disadvantages by producing a colored soft lens with a clear central portion by a simple method which results in a colored soft contact lens which is structurally different from the colored soft contact lenses disclosed in the prior art.

DISCLOSURE OF THE INVENTION

This invention relates to corneal contact lenses of soft plastic material, and more particularly to those of the type adapted for cosmetic use as well as for correction of vision. The invention further involves manufacture by lathe cutting or machining of the soft contact lenses from a preformed, multicolored body of plastic material in pre-hydrated condition. As will be explained in greater detail hereinafter, the lens is not hydrated until after it is cut from the multicolored body of plastic material at which time it absorbs fluid and expands.

A contact lens of the type set forth preferably has a clear central zone or transparent portion which may be about 4 to 5 millimeters in diameter in hydrated condition, thus permitting visual transmission. The central zone serves to provide optical correction when the outer surface of the lens is ground and polished to the prescribed curvature, taking into account the curvature of the inner surface of the lens which is fitted to the wearer's cornea. In addition, a secondary colored area or iris portion is provided about the clear central zone in order to fully cover the wearer's iris. This colored area extends outwardly to a diameter of about 12 millimeters when the lens is in hydrated condition. Finally, a peripheral zone is formed about the colored area from a transparent material. This zone extends outwardly to a diameter of about 14 to 15 millimeters when the lens is in hydrated condition.

While the lens according to the present invention may be produced from any suitable material, it is presently preferred to produce the lens from a hydrogel based on 2-hydroxyethylmethacrylate (HEMA) crosslinked with ethylene glycol dimethacrylate (EGDM). Other suitable hydrophilic synthetic polymers useful in the instant invention include those described in U.S. Pat. Nos. 3,520,549 and 3,520,949, and British Patent No. 1,004,424.

Such materials may also be colored to produce an opacified body or blank of the desired color by the addition of dye or of dispersed pigment, as set forth in the patents noted above. As defined herein an opacified body includes both a translucent body and an opaque body. The degree of opacity will depend upon the particular color and quantity of color employed and the thickness of the body or blank. It is presently preferred to employ colored plastic materials of the type disclosed in my copending application Ser. No. 06/347,082 filed Feb. 8, 1982, now abandoned and entitled "Method of Pigmenting Water-Absorbable Plastic And Product Therefrom", which is incorporated herein by reference.

The lens of the present invention lends itself to manufacture by lathe cutting rather than by the spin casting technique. The lathe cutting procedure involves cutting or machining the lens from a shaped body or blank and then polishing it, preferably by means of precision machining. Although a shaped body for lathe cut lenses has been formed in the past by casting into a stationary mold and then curing, it is a feature of the present invention that the body has multiple layers of colored and clear regions made by fabricating it from discs of the plastic HEMA material which are fused together. This procedure is most effective if the contacting disc surfaces are wetted with initiated crosslinked HEMA, compressed and oven cured.

According to the present invention the cosmetic contact lens is lathe cut from a body of hydrophilic polymer made as described above. The discs may be flat or saucer shaped so that in the finished lens there are stacked layers of clear and colored discs. The pupillary area of the lens is formed in a central zone thereof preferably from a clear layer, a secondary zone is formed about the central zone at least partly from one or more colored layers, and the periperhal zone is formed about the secondary zone from a clear layer. Where adjacent layers of the secondary zone are colored and in overlapping relationship, the concentric rings of color are blended since colored HEMA can be translucent, thus affording cosmetic opportunities.

BRIEF DESCRIPTION OF DRAWINGS

FIG. 1 is a vertical sectional view of a body of material from which the lens may be cut, with broken lines indicating a proposed lens in phantom;

FIGS. 2 and 3 are vertical sectional and plan views, respectively, of a lens corresponding to the lens shown in phantom FIG. 1, made according to the invention;

FIG. 4 is a vertical sectional view of another embodiment of the invention, similar in content to the view of FIG. 1;

FIG. 5 is a vertical sectional view of a lens made from the body of FIG. 4;

FIG. 6 is a vertical sectional view of another embodiment of the invention, similar in content to the view of FIG. 1;

FIG. 7 is a vertical sectional view of the lens made from the body of FIG. 6;

FIG. 8 is a view similar to FIG. 1 of yet another embodiment of the invention; and FIG. 9 is a vertical sectional view of a lens made from the blank of FIG. 7.

BEST MODE OF CARRYING OUT THE INVENTION

There is shown in FIG. 1 a blank or body of material in pre-hydrated condition which becomes soft and swollen when wet (hydrated). It is a hydrophilic polymer, preferably 2-hydoxyethylmethacrylate (HEMA) crosslinked with ethylene glycol dimethacrylate (EGDM) or a suitable equivalent. When in pre-hydrated condition the body, also known as a "button" in the art, may be lathe cut or machined into a lens and then polished to the usual shape to have the prescribed optical characteristics. The lens is thereafter hydrated.

The body of FIG. 1 is designated 10, and comprises a lower layer 12, an intermediate layer 14, and an upper layer 16. The layers 12 and 16 are clear and the intermediate layer 14 is colored and opacified. The body 10 is preferably about 0.5 inches in diameter and about 5.5 millimeters thick . Layers 12 and 14 are each preferably about 1.5 millimeters thick and the upper layer 16 is preferably about 2.5 millimeters thick. While these dimensions are presently preferred, body 10 including layers 12,14 and 16 may have any suitable dimension. The thickness of the body 10, particularly layers 12 and 14, depends on the curvature radius needed to produce the desired lens. For example, as the curvature radius increases the layers 12 and 14 are made thicker without changing the overall thickness of body 10. Also shown in this view in phantom and designated 18 is a contact lens which may be lathe cut from blank 10. The lens 18 is described in further detail with reference to FIGS. 2 and 3.

The lens 18 is a circular segment of a sphere, having a circular edge 20, an outer convex surface 22, and an inner concave surface 24. The pupillary area 26 is in a central zone of the lens, and it is formed entirely from the clear upper layer 16. The secondary zone 28 formed about the central zone 26 is formed entirely from colored intermediate layer 14. The peripheral zone 29 formed about the central zone 26 is formed entirely from the clear lower layer 12. This zone partly covers the sclera when worn. As best seen in FIG. 2, adjacent layers of the lens are in overlapping relationship, creating zones of diffused color which creates a lens of cosmetic interest even though only a single layer of translucent color is used.

In the embodiment of FIGS. 1 and 3, the layers of color extend generally parallel to the circular edge 20.

METHOD

The method for making the body, such as body 10, according to the invention will now be described.

The body 10 is made by first forming individual discs corresponding to the layers 12, 14 and 16 from a hydrophilic polymer such as HEMA. In the case of the colored intermediate layer 14, color is preferably introduced to the HEMA before casting into discs by means of dispersed pigments or dyes. It is presently preferred to employ pigmented HEMA materials of the type described in my copending application Ser. No. 06/347,082 filed Feb. 8, 1982, now abandoned and entitled "Method Of Pigmenting Water-Absorbant Plastic And Product Thereform". These discs are wetted with initiated crosslinked HEMA gel on their mutually facing contact surfaces, then compressed thereby forcing out substantially all of the gel and oven cured at 80° to 95° C. for 12 hours. As defined herein, initiated crosslinked HEMA is HEMA to which a suitable crosslinking agent has been added such as an olefin glycol dimethacrylate and to which an initiator such as an organic peroxide has been added. This method results in a body 10 having all discs bonded and fused together in a strong, integral unit.

The lens 18 is then formed by lathe cutting it from the body 10. It is thereafter polished by means of precision machining techniques which are well known in the art.

Finally, the lens is hydrated by well known techniques with distilled water, a saline solution or the like. When hydrated the lens absorbs fluid and expands. The lens normally expands 20% (38% water absorption), but may expand more if another material such as methacrylic acid is added to the HEMA. For example, a lens having the following dimensions: a central zone having a diameter of 3.4 mm, a secondary colored zone having a diameter of 10.0 mm and a peripheral zone having a diamter of 12.0 mm will expand to a lens with a central zone having a diameter of 4.08 mm, a secondary colored zone having a diameter of 12.0 mm and a peripheral zone of 14.4 mm when hydrated and assuming about 20% expansion.

An alternative embodiment according to the present invention will now be described with reference to FIGS. 4 and 5. The body of FIG. 4 is designated by the numeral 32, and the lens of FIG. 5 made therefrom is designated 34. For the sake of brevity, correspondingly similar elements of the various embodiments will be designated by like reference numerals. Thus, it will be seen that the embodiment of FIGS. 4 and 5 differs from the embodiment of FIGS. 1 and 3 in that two layers 36, 38 of translucent color are provided intermediate the bottom layer 12 and the upper layer 16, in place of single layer 14. By using two different colors for the layers 36, 38 a different cosmetic effect may be achieved, not only by pairing compatible colors, but also by the blending or shading effect of their overlapping relationship.

A further embodiment according to the present invention will now be described with reference to FIGS. 6 and 7. In the embodiment of FIGS. 6 and 7 like reference numerals are again employed to designate structurally similar parts. As shown in FIG. 6, the lens 40 is formed from a blank 41. FIG. 7 shows the cut lens. As shown, there is disposed between the bottom layer 12 and upper layer 16 four flat, colored layers respectively designated 42,44,46,48. This arrangement is particularly suitable for four layers that are different shades of the same color. Again, the areas of overlap provide regions of blended and diffused colors that are appealing visually. A wide variety of color choices may be used to obtain an aesthetically pleasing result.

In this embodiment, as well as the others, the pupillary area is curved into the central zone to provide a clear visual area of about 4 to 5 millimeters in diameter. The translucent quality of the colored peripheral zone also permits some additional visual transmission.

A still further embodiment according to the present invention will now be described with reference to FIGS. 8 and 9. There is shown in FIGS. 8 and 9 a body 50 which is cut into a lens 52. This embodiment is similar to the embodiment of FIGS. 4 and 5 except that the layers are not flat like the layers 36, 38. Instead, layers 54, 56 of lens 52 are curved or saucer shaped, defining a curve of greater radius than that of the concave surface of the lens. The layers 54, 56 may be regarded as circular segments of a sphere, as is the lens itself, except that the radius of each layer is larger than that of the lens. The circular periphery of each layer is disposed parallel to the circular edge 20. As best seen in FIG. 8, this arrangement of layers maximizes the overlap of the layers and thus provides a lens having a greater amount of blended and diffused color between adjacent, concentric rings of color in the peripheral zone.

While the invention has been shown in but several forms, it will be obvious that it is susceptible of various further changes and modifications which will fall within the scope of the claims that follow.

What is claimed is:

1. A cosmetic contact lens in the shape of a circular segment of a sphere and having a circular edge, comprising stacked, fused clear and colored layers of a water swellable hydrophilic crosslinked polymer of 2-hydroxyethylmethacrylate, with a pupillary area formed in a central zone thereof from a clear layer, a secondary zone formed about said central zone at least partly from one or more colored layers, and a peripheral zone formed about the secondary zone from a clear layer, each of said layers being formed from the same polymer, and said colored layers and at least one clear layer being disposed in overlapping relationship and parallel to the circular edge of the lens; and said lens being sized and shaped to be worn on the eye with said central zone registering with the pupil of the eye and said secondary zone covering the iris of the eye, the construction of said lens providing concentric circles of color which are diffused and blended together where the adjacent layers are in overlapping relationship.

2. A cosmetic lens according to claim 1, wherein said colored layers of said secondary zone are segments of spheres each having a radius flatter than the radius of the spherical shape of the lens and each terminating with its circular periphery disposed parallel to said circular edge.

3. A cosmetic lens according to claim 1, wherein said colored layers are translucent.

* * * * *